June 21, 1932.  H. D. BOB  1,864,181
SOFT COLLAR
Filed March 23, 1931
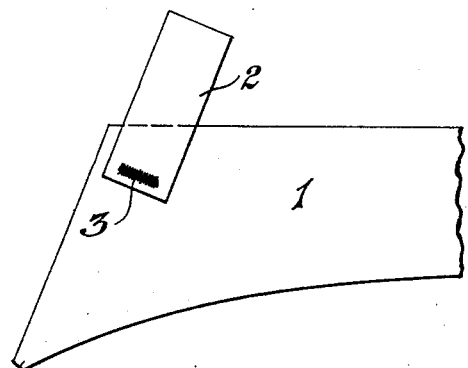
Fig. 1.
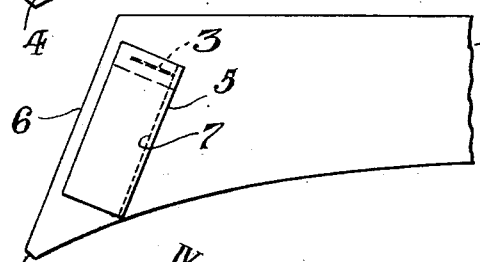
Fig. 2.  Fig. 4.
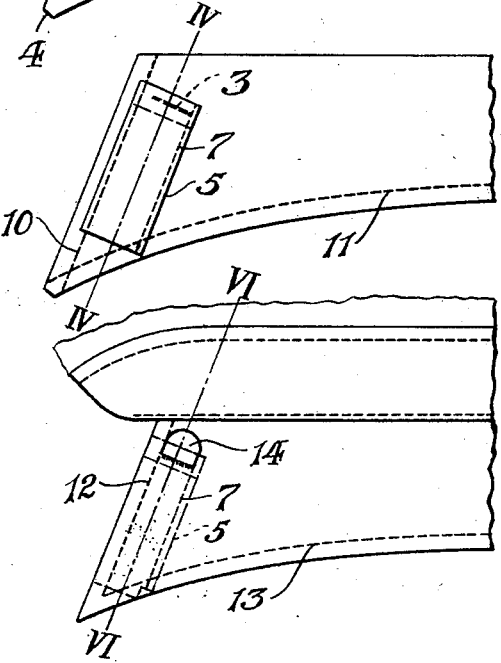
Fig. 3.
Fig. 5.  Fig. 6.
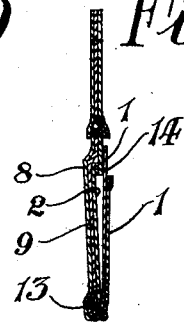
Inventor
Herman D. Bob
By his Attorneys
Harry D. Nims Patented June 21, 1932

1,864,181

UNITED STATES PATENT OFFICE

HERMAN D. BOB, OF BROOKLYN, NEW YORK

SOFT COLLAR

Application filed March 23, 1931. Serial No. 524,526.

This invention relates to an improvement in soft folded-over collars and more particularly to such collars as are provided at their front folded over portions with stiffening means.

The object of my invention is to provide an improved pocket for such stiffening means designed to facilitate the insertion therein of the stiffening means. A further object is to provide an improved method of forming the pocket for the stiffening means.

Further objects accomplished by my invention will be apparent from the following detailed description.

In the drawing, to which reference is now made, like numerals indicate like parts.

Fig. 1 shows one end of the inner ply of a soft collar to which the material of an insert used in making the pocket has been buttonhole stitched and is illustrative of the first step in making the collar.

Fig. 2 shows the insert used in forming the pocket folded downwardly over the buttonhole stitching and stitched to the inner ply on one edge thereof.

Fig. 3 shows a further step in the manufacture of the collar with the ply of Fig. 2 stitched to the other plies of the collar.

Fig. 4 is a sectional view taken on the line IV—IV of Fig. 3.

Fig. 5 is a rear view of one end of the finished collar.

Fig. 6 is a section on line VI—VI of Fig. 5.

Referring to Fig. 1 of the drawing, 1 is the inner ply of a soft collar in which the pocket according to this invention is to be formed. At 2, is shown the insert which is adapted to cooperate with the ply 1 for forming the pocket. The material of this insert may be stiff muslin or any other suitable fabric. The lower end of this material is placed on ply 1 with its lower edge adjacent that portion of the collar in which the slit 3 for the insertion of the stiffening member is to be provided, and is adapted to be connected to the said ply by buttonhole stitching surrounding said slit, which extends through the ply 1 and the material of the insert 2.

After being buttonhole stitched to the ply 1 the material is folded downwardly upon a line slightly above the slit 3, the length of the material being such that when folded over it falls short of point 4 of the ply 1, as shown in Fig. 2. The material is then connected to the ply 1 by a seam 7, extending adjacent the edge 5 thereof remote from the front edge 6 of the ply 1.

The ply 1 is then associated with a ply 8 of the same material and with a stiffening member 9 in the usual manner, the second ply and the stiffening member being of the same shape as the ply 1. These three plies are sewn together by marginal seams 10 and 11 extending around the sides and lower edge thereof, the side seam 10 preferably extending through the material 2 adjacent the outer edge thereof. The three ply material is then folded inside out with the stiffening layer 9 arranged between the inner and outer plies 1 and 8. By this folding operation the insertion 2 will be positioned inside the collar between the ply 1 and the stiffening member 9.

When so folded the collar is finished by forming additional marginal seams 12 and 13, the marginal seams 12 at each end of the collar extending through the material 2 adjacent the outer end of the buttonhole 3 as shown in Fig. 5 and thereby cooperating with the seam 7 in the insert 2 to form a pocket for the insertion of the stiffening member 14 as shown in Fig. 5. The length of the insert 2 may be such that the lower marginal seam 13 of the collar extends therethrough though this is not necessary.

The collar is attached to the collar band 14 in any well-known manner.

The pocket as shown in Fig. 5 is provided immediately adjacent the side seam, the lower portion of the pocket being defined by the junction of the lower end of seam 12 with seam 13.

The stiffening member 3 is so shaped at its lower end that it fits into the angle formed by said seams. The length of the stiffening member is such that it projects upwardly from the buttonhole 3 when placed in position, the buttonhole being provided at such a distance below the top fold of the collar to allow for such projecting portion.

As clearly seen from Fig. 6 of the drawing the pocket of the stiffening member 14 is provided between the ply 1 and the material forming the insert 2, the front wall of the pocket comprising the material 2 and the rear wall thereof comprising the material of ply 1. It will also be seen from this figure that the fold in the material 2 will prevent the stiffening member 3 from being accidentally forced in an upward direction thereby preventing any possibility of damage to the upper portion of the collar by a careless insertion.

My invention is subject to many modifications and changes and I desire to include all such modifications and changes within the scope of my claims.

Having thus described my invention what I claim is:

1. In a soft collar, a pocket adapted to receive and retain a stiffening member, said pocket being formed between one ply of the collar and an insert to the rear thereof, the entrance to said pocket comprising a buttonholed slit extending through a folded portion of said insert the insert being folded near the top thereof on a line substantially parallel to the longitudinal axis of said buttonholed slit.

2. The method of making a pocket in a soft collar adapted to receive and retain a stiffening means which consists in attaching an insert of fabric material to the inner ply of said soft collar by means of buttonhole stitching which surrounds a slit extending through said ply and said insert, folding said insert downwardly on a transverse line adjacent said slit, stitching the side of said insert remote from the front edge of the ply to said ply, affixing said ply to the outer ply of said collar along the front edges of the plies, turning said plies inside out with said insert between said plies, and forming a marginal seam about the side and lower edges of said plies, the said seam extending through said insert.

3. The method of making a pocket in a soft collar adapted to receive a stiffening means through a slit forming the entrance to said pocket which consists in attaching an insert of fabric material to the inner ply of said collar adjacent said slit, folding said insert downwardly on a transverse line adjacent said slit, stitching the side of said insert remote from the front edge of the ply to said ply, affixing said ply to the outer ply of said collar on the front edge of the plies, turning said plies inside out with said insert between said plies, and forming a marginal seam about the side and lower edges of said plies, the said seam extending through said insert.

4. In a soft collar having a plurality of plies of material, a pocket adapted to receive and retain a stiffening member, one side of said pocket comprising an insert, the other side comprising one ply of the collar, said insert being attached lengthwise to one of the plies by seams along both sides of the insert, the outer seam forming also a seam for connecting the plies, the entrance to said pocket comprising a buttonholed slit extending through said collar ply and through a folded portion at the top of said insert.

In witness whereof I have hereunto subscribed my name this 20th day of March, 1931.

HERMAN D. BOB.